(12) United States Patent
Rdzanek (10) Patent No.: US 11,065,988 B1
(45) Date of Patent: Jul. 20, 2021

(54) EASY ENTRY LATCH FOR VEHICLE SEAT

(71) Applicant: Faurecia Automotive Seating, LLC, Auburn Hills, MI (US)

(72) Inventor: Emil Rdzanek, Piaseczno (PL)

(73) Assignee: Faurecia Automotive Seating, LLC, Auburn Hills, MI (US)

( * ) Notice: Subject to any disclaimer, the term of this patent is extended or adjusted under 35 U.S.C. 154(b) by 0 days.

(21) Appl. No.: 16/941,721

(22) Filed: Jul. 29, 2020

(51) Int. Cl.
*B60N 2/12* (2006.01)
*B60N 2/90* (2018.01)
*B60N 2/20* (2006.01)

(52) U.S. Cl.
CPC ........ *B60N 2/12* (2013.01); *B60N 2/20* (2013.01)

(58) Field of Classification Search
CPC ...... B60N 2/12; B60N 2/01583; B60N 2/123; B60N 2/366; B60N 2002/126; B60N 2002/957; B60N 2/01508; B60N 2/20
USPC ........................................ 297/354.1
See application file for complete search history.

(56) References Cited

U.S. PATENT DOCUMENTS

| | | | | |
|---|---|---|---|---|
| 9,592,748 B2 * | 3/2017 | Gordeenko | ............ | B60N 2/366 |
| 10,442,322 B2 * | 10/2019 | Handigol | ............ | B60N 2/0232 |
| 10,479,232 B2 * | 11/2019 | Cooley | ............ | B60N 2/12 |
| 2013/0292982 A1 * | 11/2013 | Radermacher | ............ | B60N 2/20 297/318 |
| 2015/0136934 A1 * | 5/2015 | Gordeenko | ........ | B60N 2/01516 248/503.1 |
| 2016/0318424 A1 * | 11/2016 | Dlugokecki | ............ | B60N 2/12 |
| 2017/0088023 A1 * | 3/2017 | Smuk | .............. | B60N 2/01583 |
| 2017/0253146 A1 * | 9/2017 | Cooley | ............ | B60N 2/123 |
| 2018/0215288 A1 * | 8/2018 | Hiemstra | ............ | B60N 2/3011 |
| 2019/0152352 A1 * | 5/2019 | Handigol | ............ | B60N 2/1695 |

FOREIGN PATENT DOCUMENTS

| | | |
|---|---|---|
| CN | 107187343 A | 9/2017 |
| CN | 207510267 U | 6/2018 |
| EP | 2861454 B1 | 4/2015 |

* cited by examiner

*Primary Examiner* — Shin H Kim
(74) *Attorney, Agent, or Firm* — Barnes & Thornburg LLP (57) ABSTRACT

An occupant support includes a vehicle seat mounted to a foundation frame for sliding the vehicle seat longitudinally in a vehicle. The vehicle seat is movable from a slid-back configuration to a forward-seating configuration and may be changed from a horizontal-use configuration to a tilted configuration for easy entry into or exit from a rear row of the vehicle. The vehicle seat may be locked in the tilted configuration.

20 Claims, 10 Drawing Sheets

EASY ENTRY LATCH FOR VEHICLE SEAT

BACKGROUND

The present disclosure relates to vehicle seats, and particularly to movable vehicle seats. More particularly, the present disclosure relates to motion-control mechanisms included in movable vehicle seats.

SUMMARY

According to the present disclosure, an occupant support for a vehicle includes a foundation frame configured to be coupled to a floor of the vehicle and a vehicle seat that is mounted to the foundation frame. The vehicle seat is mounted to the foundation frame for sliding movement relative to the foundation frame between a slid-back configuration and a forward-seating configuration when the vehicle seat is being used by an occupant seated thereon in a horizontal-use configuration. The vehicle seat is configured to move from the horizontal-use configuration to a tilted configuration in which at least a portion of the vehicle seat is tilted relative to the foundation frame. The vehicle seat may be moved to a slid-forward configuration for easy entry into or exit from a rear row of the vehicle behind the occupant support.

In illustrative embodiments, the occupant support further includes a tilt-limiting unit that is configured to control the position of the vehicle seat relative to the foundation frame when switching between the horizontal-use configuration and the tilted configuration. The tilt-limiting unit is configured to lock the vehicle seat in the tilted configuration when the vehicle seat is in the forward-seating configuration. The tilt-limiting unit blocks the vehicle seat from returning to the horizontal-use configuration until the tilt-limiting unit is disengaged by moving the vehicle seat toward the slid-back configuration.

In illustrative embodiments, the tilt-limiting unit includes a retainer pin fixed to the vehicle seat relative to the foundation frame, a retainer hook configured to move relative to the foundation frame, and a stationary stop mounted to the foundation frame. The retainer hook is configured to change from a freed position when the vehicle seat is in the horizontal-use configuration, to a locked position, when the vehicle seat is in the tilted configuration. In the freed position, the retainer hook is positioned entirely above an upper limit of the stationary stop so that the vehicle seat can slide forward and aft unobstructed. The retainer hook is biased to move to the locked position as the vehicle seat changes to the tilted configuration such that a portion of the retainer hook extends below the upper limit of the stationary stop and another portion of the retainer hook is positioned to block the vehicle seat from returning to the horizontal-use configuration.

Additional features of the present disclosure will become apparent to those skilled in the art upon consideration of illustrative embodiments exemplifying the best mode of carrying out the disclosure as presently perceived.

BRIEF DESCRIPTION OF THE DRAWINGS

The detailed description particularly refers to the accompanying figures in which.

DETAILED DESCRIPTION

Figure 1:
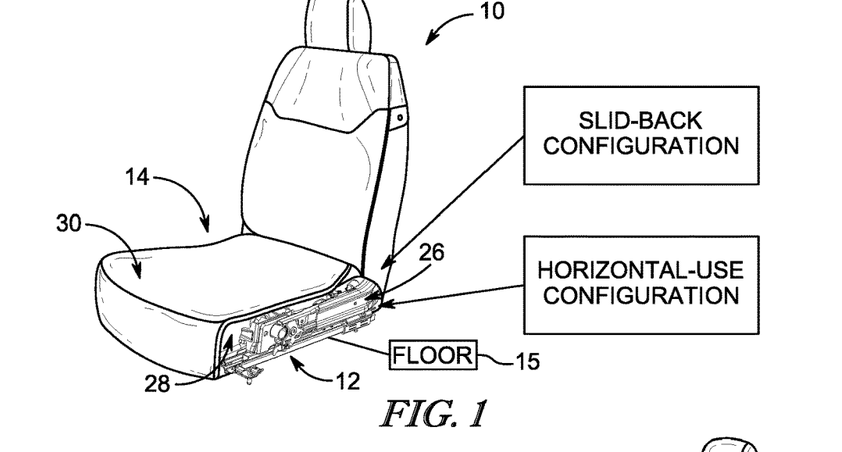
FIG. 1 is a perspective and diagrammatic view of an occupant support including a seat foundation mounted to a floor of a vehicle and a vehicle seat coupled to the seat foundation for sliding movement relative to the seat foundation between a slid-back configuration, as shown in FIG. 1, a forward-seating configuration, as shown in FIG. 2, and a slid-forward configuration when the vehicle seat is tiled upwardly to a tilted configuration for easy entry into a rear row of a vehicle, as shown in FIG. 3.
Figure 2:
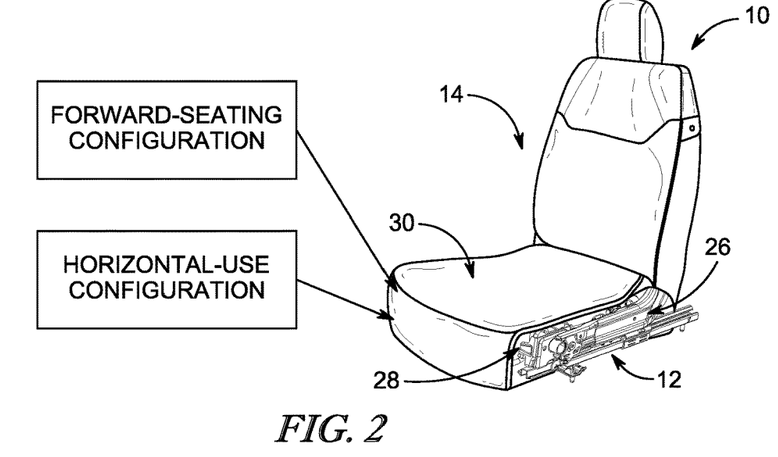
FIG. 2 is a perspective and diagrammatic view similar to FIG. 1 showing the vehicle seat moved to the forward-seating configuration and arranged in a horizontal-use configuration where the vehicle seat is arranged relative to the seat foundation to support an occupant thereon.

An illustrative occupant support 10, in accordance with the present disclosure, is shown in FIG. 1 and is configured to mount to a floor 15 of a vehicle. The occupant support 10 includes a foundation frame 12 coupled to the floor 15 of the vehicle and a vehicle seat 14 mounted on the foundation frame 12. The foundation frame 12 is configured to support the vehicle seat 14 above the floor 15 between a front-row passenger support and a back-row passenger support, for example. Vehicle seat 14 is slidable relative to the foundation frame 12 from a slid-back configuration, as shown in FIG. 1, to a forward-seating configuration, as shown in FIG. 2. The vehicle seat 14 is configured to support an occupant at any position between the slid-back configuration and the forward-seating configuration to fit occupants of different sizes. In the forward-seating configuration, the vehicle seat 14 may be moved to a tilted configuration and slid farther forward relative to the foundation frame 12 to a slid-forward configuration, as shown in FIG. 3, for easy entry into a back-row of the vehicle.

Figure 3:
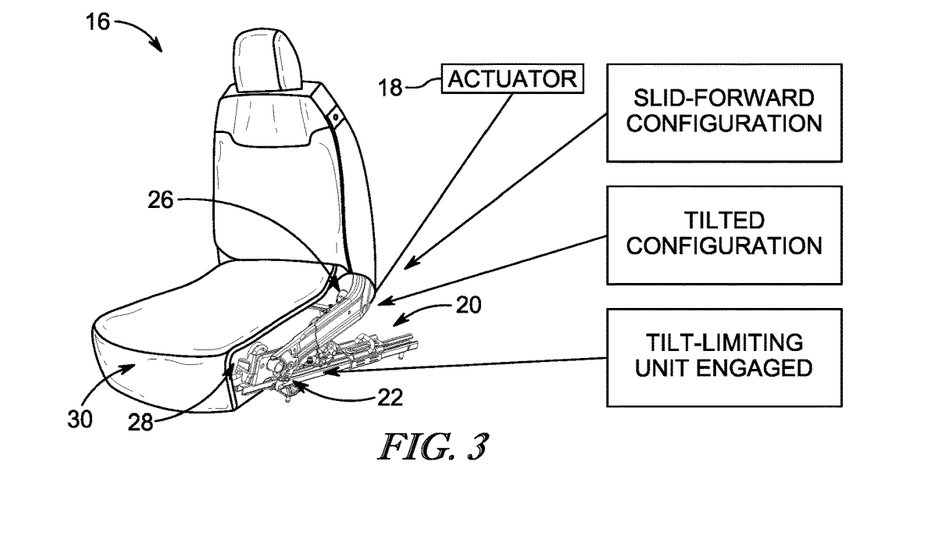
FIG. 3 is a perspective and diagrammatic view showing the vehicle seat moved from the horizontal-use configuration to the tilted configuration and showing that the occupant support further includes a tilt-limiting unit that engages when the vehicle seat is moved to the tilted configuration to lock the vehicle seat in the tilted configuration until the vehicle seat is moved from the slid-forward configuration toward the slid-back configuration.
Figure 7:
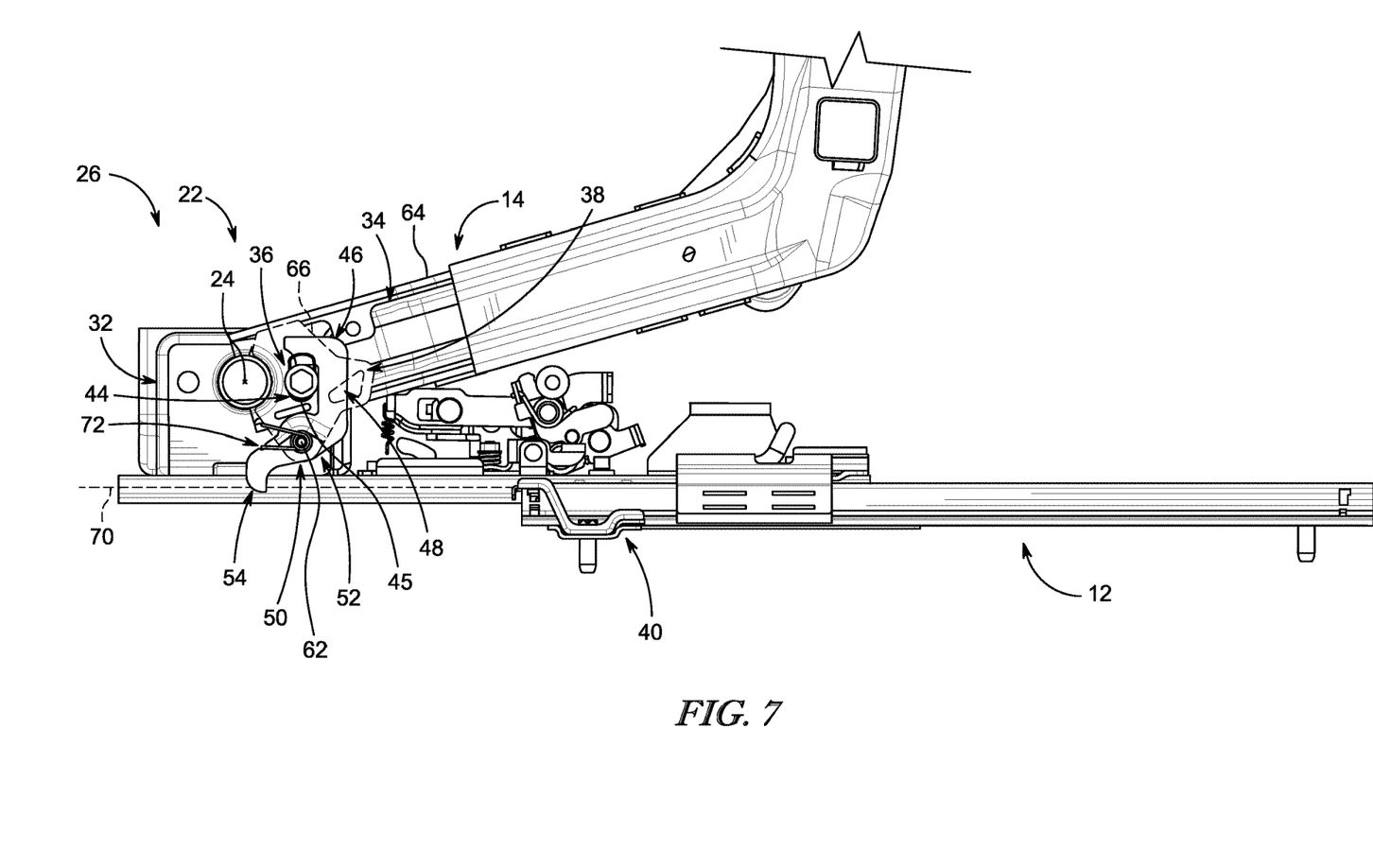
FIG. 7 is a side view of the occupant support with portions removed showing the vehicle seat arranged in the slid-forward configuration and the tilted configuration and showing the tilt-limiting unit engaged and the retainer hook extending below the upper limit of the stop so that when the vehicle seat is moved from the slid-forward configuration toward the slid-back configuration, the retainer hook will engage the stop, as shown in FIG. 8, to free the retainer hook from the retainer pin and urge the vehicle seat toward the horizontal-use configuration.
Figure 12:
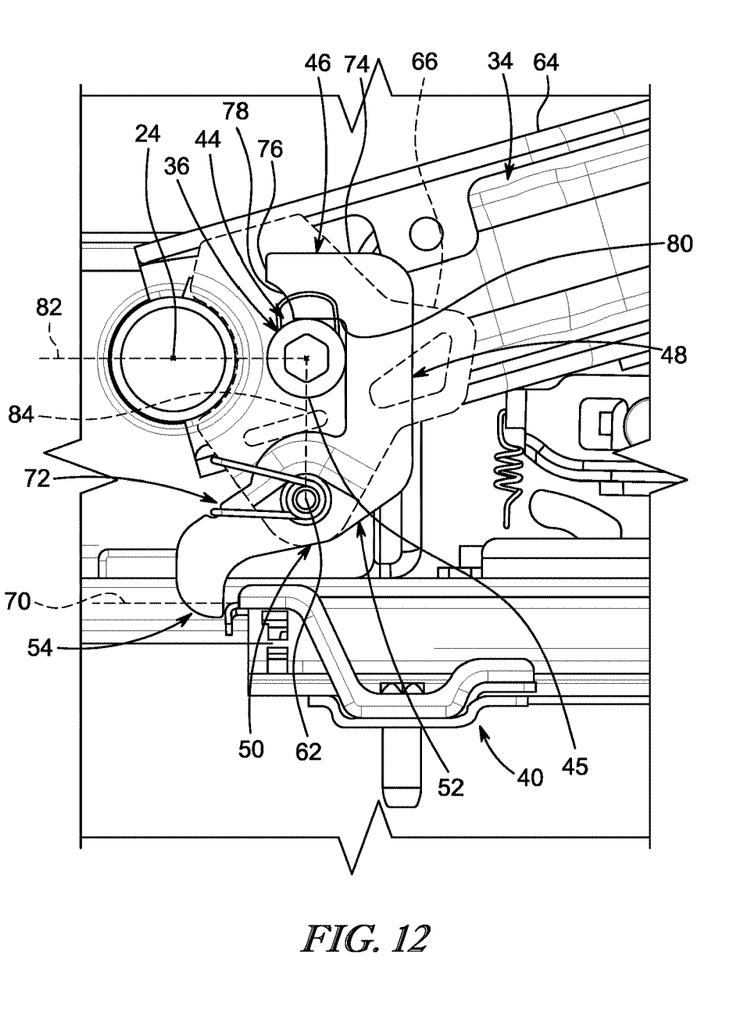
FIG. 12 is an enlarged portion of FIG. 8 showing the vehicle seat in the tilted configuration and the retainer hook of the tilt-limiting unit extends below the upper limit of the stop to engage the stop when the vehicle seat is moved from the slid-forward configuration toward the slid-back configuration.

The occupant support 10 further includes a pivot-control system 16 that controls movement of the vehicle seat 14 between the horizontal-use configuration and the tilted configuration as suggested in FIGS. 1-3. The pivot-control system 16 includes an actuator 18, a seat lock 20 coupled to the actuator 18, and a tilt-limiting unit 22 configured to lock the vehicle seat 14 in the tilted configuration as shown in FIG. 3. The actuator 18 may be a button, handle, strap, lever, or another suitable structure that can be actuated by a user to change the vehicle seat 14 from the horizontal-use configuration to the tilted configuration. The seat lock 20 is configured to retain the vehicle seat 14 in the horizontal-use configuration until the vehicle seat 14 is moved to the forward seating configuration and the actuator 18 is moved by the user to disengage the seat lock 20 so that the vehicle seat 14 can pivot about a forward, frame pivot axis 24 from the horizontal-use configuration to the tilted configuration. The tilt-limiting unit 22 is configured to stop pivoting of the vehicle seat 14 about the frame pivot axis 24 at a predetermined orientation relative to the foundation frame 12 to arrange the vehicle seat in the tilted configuration as shown in FIGS. 3, 7, and 12. The tilt-limiting unit 22 also blocks the vehicle seat 14 from returning to the horizontal-use configuration until the vehicle seat 14 is moved toward the slid-back configuration to cause the tilt-limiting unit 22 to disengage while simultaneously urging the vehicle seat 14 toward the horizontal-use configuration as suggested in FIGS. 9 and 13.

In the illustrative embodiment, the predetermined orientation limits tilting of the vehicle seat 14 relative to the foundation frame 12 to about 16 degrees. The predetermined orientation may be suitably adjusted depending on the shape or size of the vehicle seat 14, the dimensions and locations of the tilt-limiting unit 22, or the location of the vehicle seat 14 relative to other components within the vehicle.

The vehicle seat 14 includes seat frame 26, foam pads 28 coupled to the seat frame 26, and an outer trim 30 that covers the seat frame 26 and the foam pads 28 as shown in FIGS. 1-3. Portions of the foam pads 28 and the outer trim are removed in FIGS. 1-3 and are entirely removed in FIGS. 4-14 to show the seat frame 26 and the pivot-control system 16. The seat frame 26, the foam pads 28, and the outer trim 30 cooperate to provide a seat bottom and a seat back for the occupant support 10 and are each movable relative to the foundation frame 12 so that vehicle seat 14 can be reconfigured to the tilted configuration for easy entry into a rear row behind occupant support 10 as shown in FIG. 3. The seat frame 26 is mounted to the foundation frame 12 for sliding movement relative to the foundation frame 12 between the slid-back configuration and the slid-forward configuration. The foam pads 28 are formed around all or portions of the seat frame 26 to provide cushioning for occupants seated on the occupant support 10. The outer trim 30 covers the foam pads 28 and the seat frame 26 and may be a cloth material, a leather material, or another suitable covering material.

Figure 4:
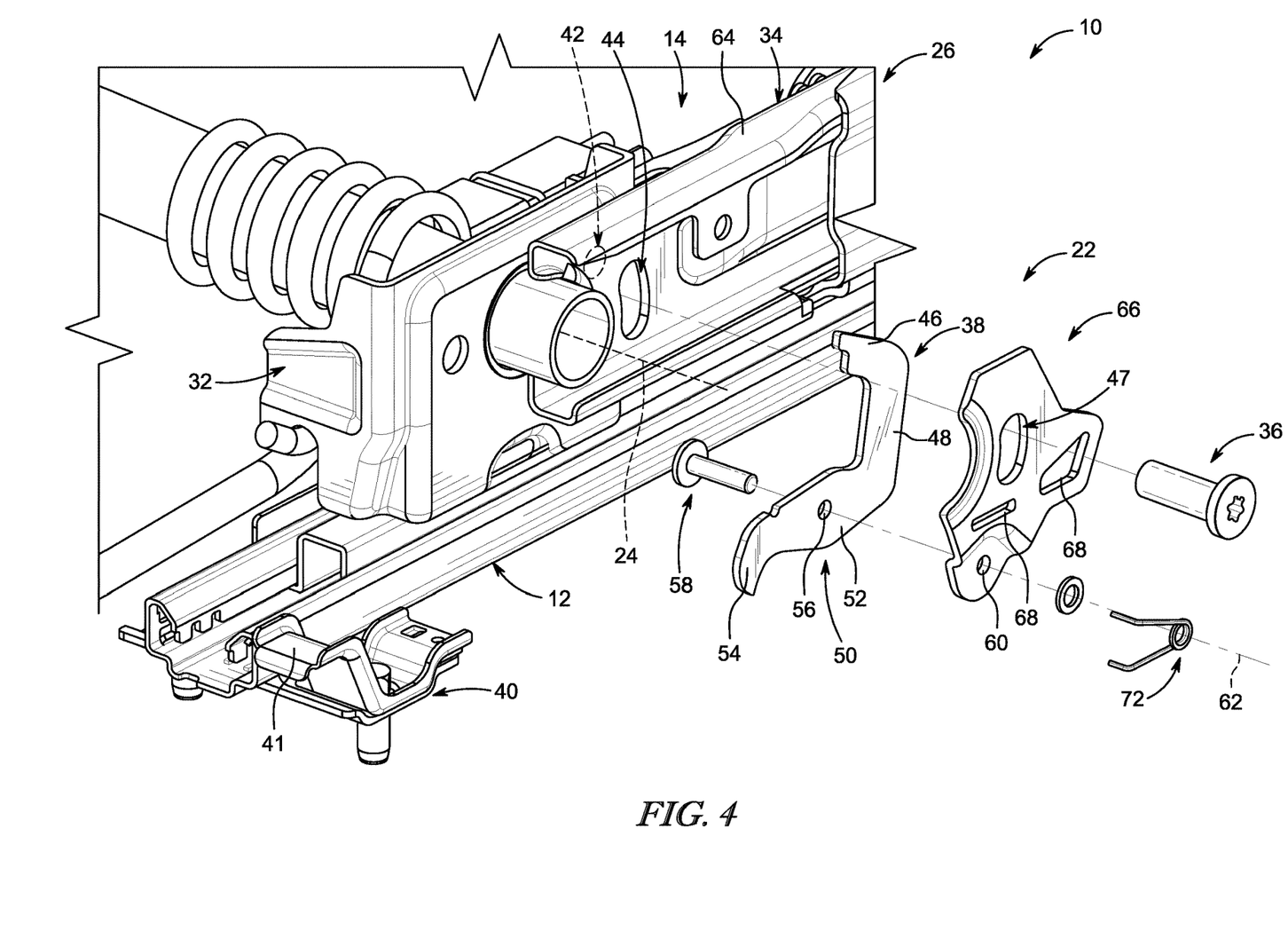
FIG. 4 is an enlarged perspective view of a portion of the occupant support with the tilt-limiting unit exploded away from the rest of the occupant support to show that the tilt-limiting unit includes a stationary retainer pin, a movable retainer hook, and a stationary stop coupled to the foundation frame.
Figure 5:
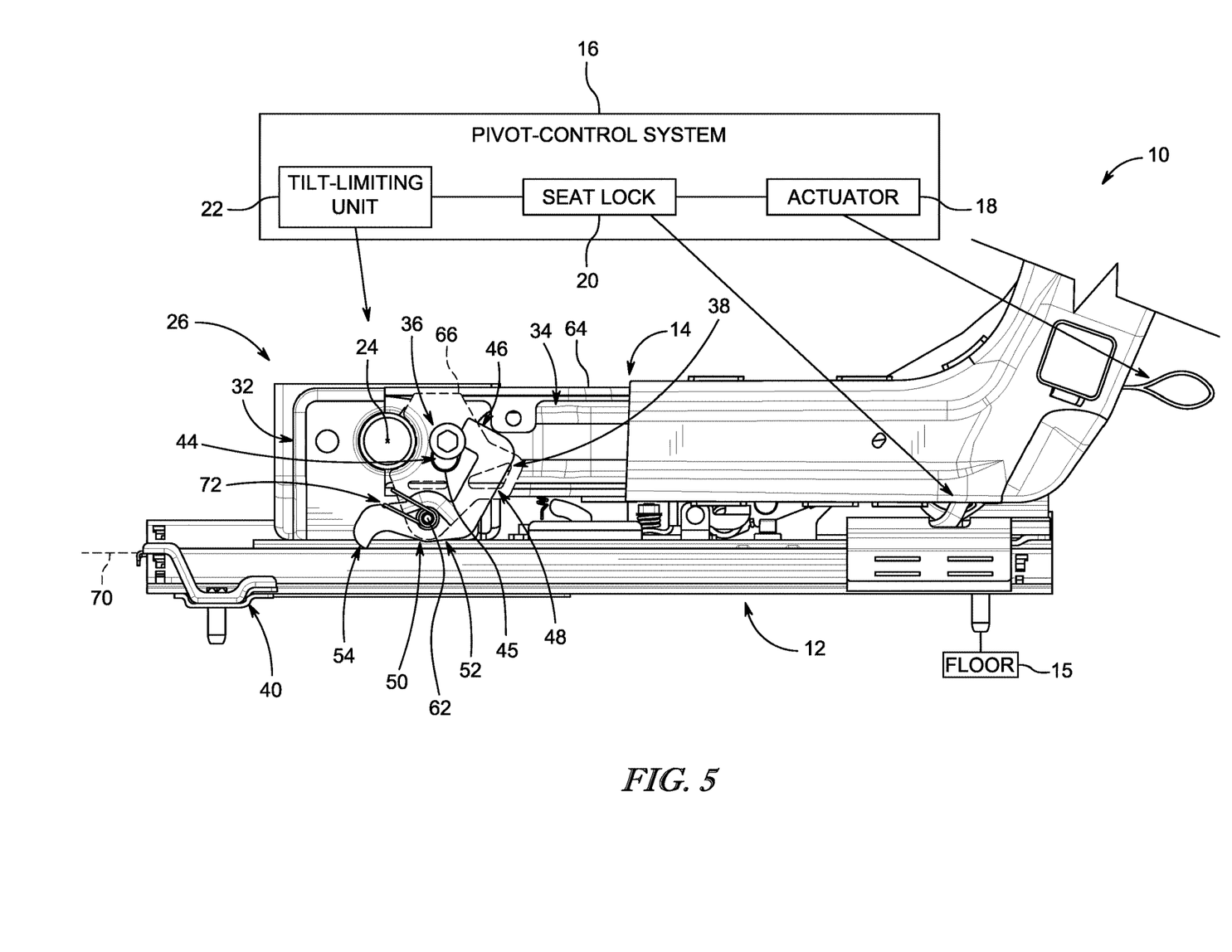
FIG. 5 is a side view of the occupant support with portions removed showing the vehicle seat arranged in the slid-back configuration and in the horizontal-use configuration and showing the retainer hook positioned above an upper limit of the stop so that the vehicle seat can move from the slid-back configuration to the slid-forward configuration as shown in FIG. 6.

The pivot-control system 16 is coupled to the seat frame 26 to support rigidly the vehicle seat 14 on the foundation frame 12 when the vehicle seat is in the horizontal-use configuration and the tilted configuration as shown in FIGS. 1-3. The seat frame 26 includes a slidable, stationary frame 32 and a pivotable frame 34 as shown in FIGS. 4 and 5. The stationary frame 32 is mounted to the foundation frame 12 for back-and-forth sliding movement on the foundation frame 12. The pivotable frame 34 is coupled to the stationary frame 32 for sliding movement with the stationary frame 32 and is configured to pivot about pivot axis 24 to change the vehicle seat 14 from the horizontal-use configuration to the tilted configuration. The seat lock 20 is configured to retain a rear end of the pivotable frame 34 to the stationary frame 32 or the foundation frame 12 until the actuator 18 is moved by a user to disengage the rear end of the pivotable frame 34 so that the vehicle seat 14 can move to the tilted configuration. The tilt-limiting unit 22 engages when the vehicle seat 14 is moved to the tilted configuration to retain the pivotable frame 34 at an angle relative to the stationary frame 32 until the vehicle seat 14 is slid rearward toward the slid-back configuration.

The tilt-limiting unit 22 includes a retainer pin 36 coupled to the stationary frame 32, a retainer hook 38 coupled to the pivotable frame 34, and a stationary stop 40 coupled to the foundation frame 12 as shown in FIG. 4. The retainer pin 36 is a stationary retainer and is mounted to the stationary frame 32 in a fixed position relative to the frame pivot axis 24. The retainer hook 38 is a movable retainer and is biased into contact with the retainer pin 36 when the vehicle seat 14 is in both the horizontal-use configuration and the tilted configuration. The stationary stop 40 is aligned laterally with the retainer hook 38 relative to the foundation frame 12 and is configured to interact with the retainer hook 38 to change the vehicle seat 14 from the tilted configuration to the horizontal-use configuration.

The retainer pin 36 is sized to fit within a first pin-receiving slot 42 formed in the stationary frame 32 and a second pin-receiving slot 44 formed in the pivotable frame 34 as shown in FIG. 4. The first pin-receiving slot 42 is circular to fix the retainer pin 36 in position on the stationary frame 32 relative to the frame pivot axis 24. The second pin-receiving slot 44 is curvilinear and extends circumferentially about frame pivot axis 24 so that the retainer pin 36 minimizes binding against the pivotable frame 34 as the pivotable frame 34 is moved relative to the retainer pin 36 during pivotable motion of the vehicle seat 14 between the horizontal-use configuration and the tilted configuration. The retainer pin 36 is configured to engage a lower end 45 of the second pin-receiving slot 44 when the vehicle seat 14 is moved to the tiled configuration to retain the pivotable frame 34 at a predetermined angle relative to the stationary frame 32 and to block further rotation of the vehicle seat 14.

Figure 11:
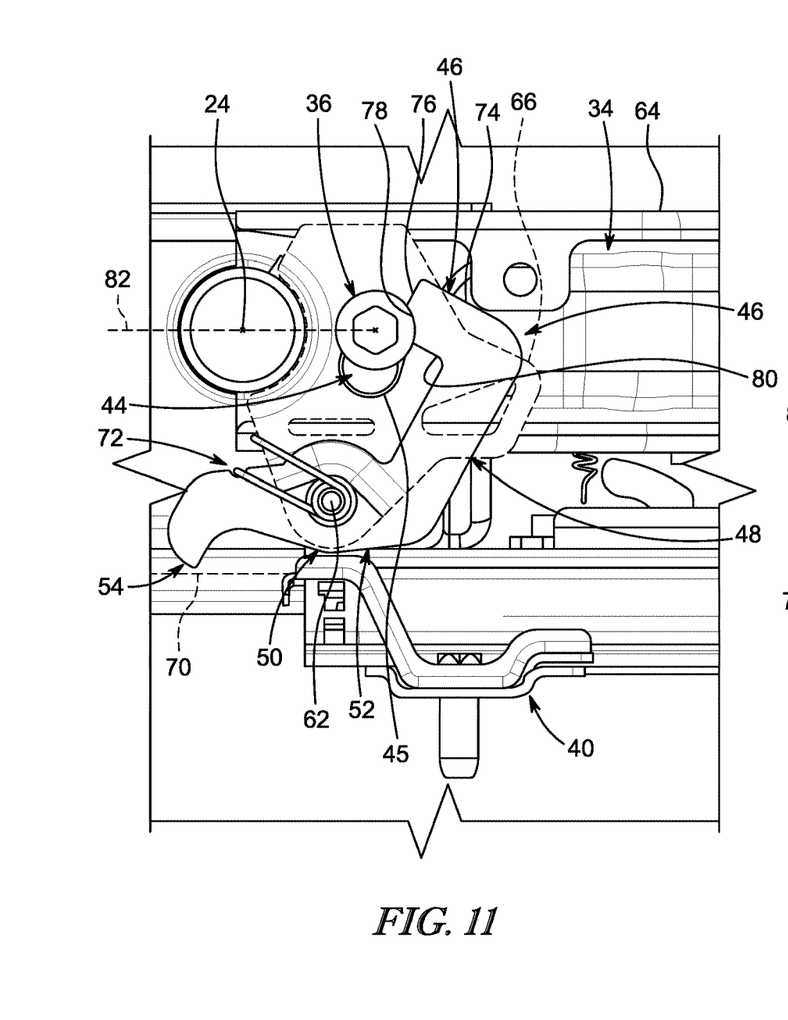
FIG. 11 is an enlarged portion of FIG. 6 showing the vehicle seat in the horizontal-use configuration and the retainer hook of the tilt-limiting unit is positioned above the upper limit of the stop so that the vehicle seat is free to move between the slid-back configuration and the slid-forward configuration.

In the illustrative embodiment, the retainer pin 36 is aligned vertically with the frame pivot axis 24 so that a center of the retainer pin 36 is located at a similar distance from the foundation frame 12 as the frame pivot axis 24. In some embodiments, the retainer pin 36 is aligned with the frame pivot axis 24 along a horizontal reference plane 82 that passes through a center of both the retainer pin 36 and the frame pivot axis 24 when the vehicle seat 14 is in the horizontal-use configuration and the tilted configuration as shown in FIGS. 11 and 12. In some embodiments, the retainer pin 36 may be offset above or below the frame pivot axis 24.

The retainer hook 38 controls when the vehicle seat 14 may be moved from the tilted configuration to the horizontal-use configuration. The retainer hook 38 includes a retainer section 46, a body section 48 that extends downwardly from the retainer section 46, and a lever section 50 coupled to the body section 48 and spaced apart from the retainer section 46. The retainer section 46 is biased into engagement with the retainer pin 36 at all times. The body section 48 interconnects the retainer section 46 and the lever section 50. The lever section 50 extends forward away from the body section 48 and downward away from the retainer section 46.

The lever section 50 includes a lever mount 52 and a lever arm 54 as shown in FIGS. 4 and 5. The lever mount 52 is coupled to the pivotable frame 34 to locate the retainer hook 38 relative to the retainer pin 36. The lever mount 52 is formed to include a mount aperture 56 receives a pin 58 as suggested in FIG. 4. The pin 58 also passes through an aperture 60 formed in the pivotable frame 34 to mount the retainer hook 38 for pivotable movement about a retainer-hook pivot axis 62 that passes through the pin 58. The lever arm 54 is located on an opposite end of the retainer hook 38 from the retainer section 46 relative to the retainer-hook pivot axis 62 such that the lever arm 54 and the retainer section 46 move in opposite forward and aft directions from one another as the retainer hook 38 pivots about the retainer-hook pivot axis 62.

In the illustrative embodiment, the pivotable frame 34 includes a frame rail 64 and a separate frame plate 66 that is coupled to the frame rail 64 and carries the retainer hook 38 for movement with the pivotable frame 34 about frame pivot axis 24. The frame plate 66 is separate from the frame rail 64 to facilitate assembly of the tilt-limiting unit 22 on the vehicle seat 14. The aperture 60 is formed in the frame plate 66 such that the retainer hook 38 is supported only by the frame plate 66 on the vehicle seat 14. The frame plate 66 may be formed to include a third pin-receiving slot 47 that is similar or identical to second pin-receiving slot 44 and that receives the retainer pin 36. The frame plate 66 is also formed to include one or more welding apertures 68 that are aligned with features of the frame rail 64 to provide attachment areas where the frame plate 66 can be welded to the frame rail 64 to fix the frame plate 66 to the frame rail 64 and locate the retainer hook 38 relative to the retainer pin 36. In some embodiments, fasteners (not shown) or another suitable attachment method may be used to attach the frame plate 66 to the frame rail 64 to locate the retainer hook 38 relative to the retainer pin 36.

Figure 6:
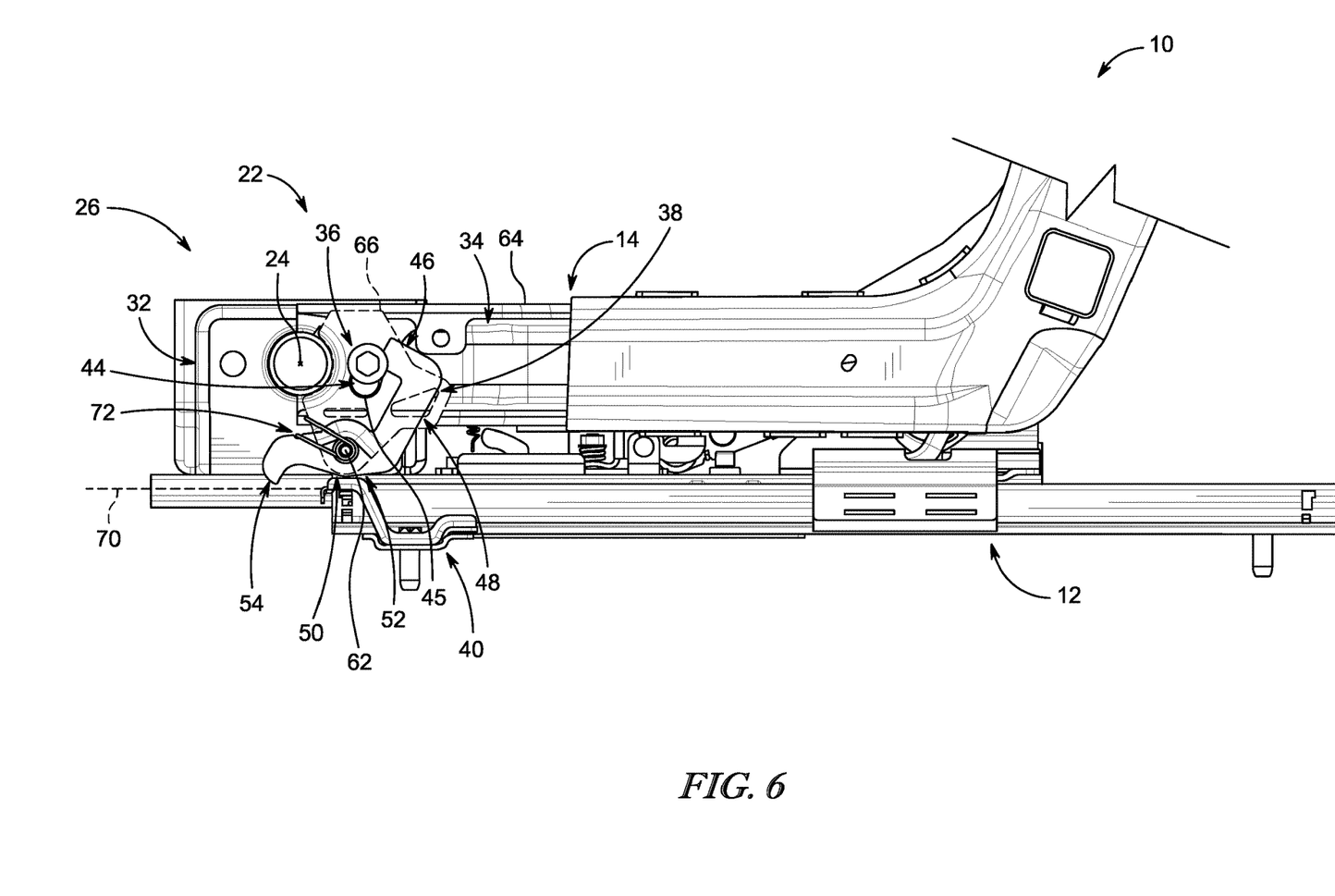
FIG. 6 is a side view of the occupant support with portions removed showing the vehicle seat arranged in the slid-forward configuration and in the horizontal-use configuration and showing the retainer hook positioned above the upper limit of the stop.
Figure 8:
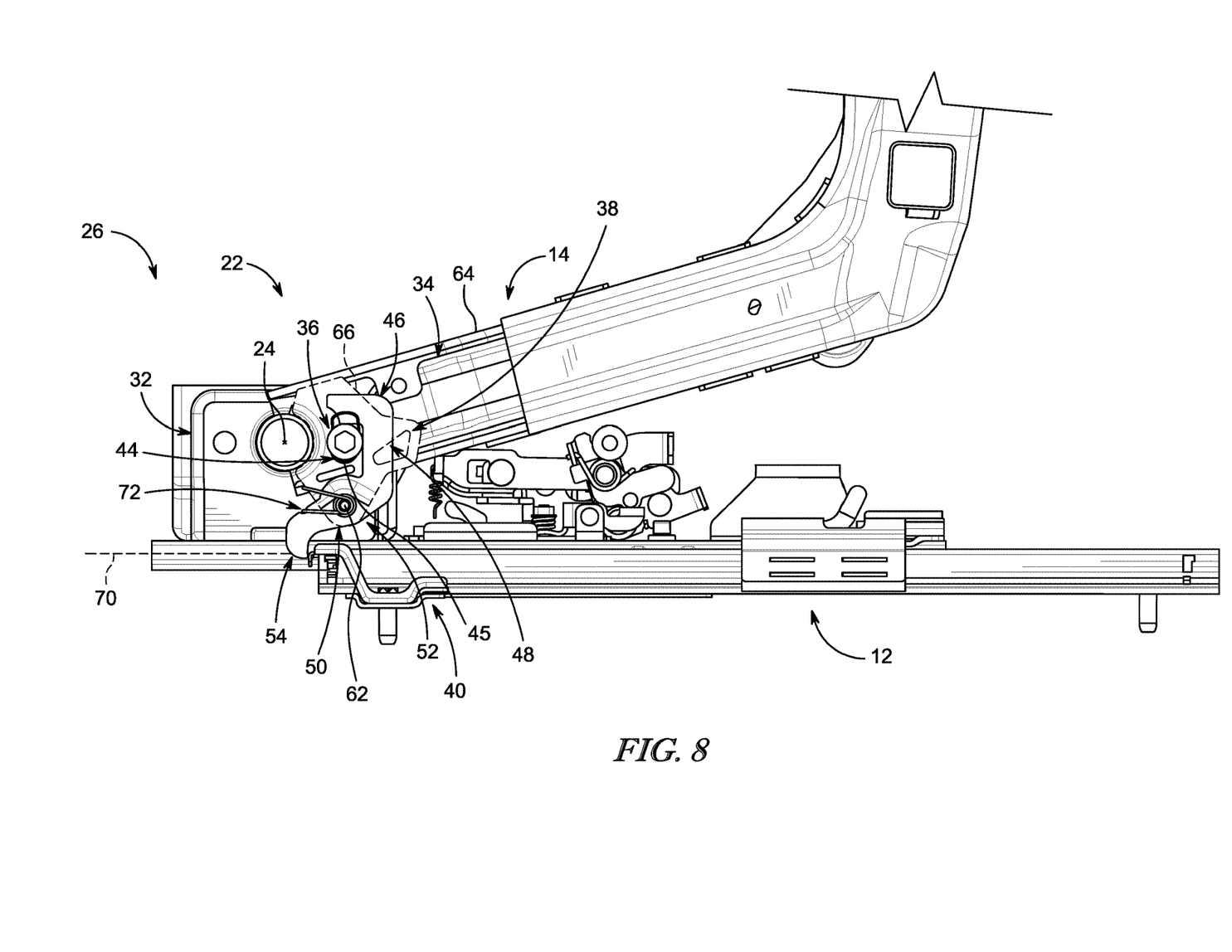
FIG. 8 is a side view of the occupant support with portions removed showing the vehicle seat arranged in the tilted configuration and moved from the slid-forward configuration toward the slid-back configuration and showing the retainer hook contacting the stop.
Figure 9:
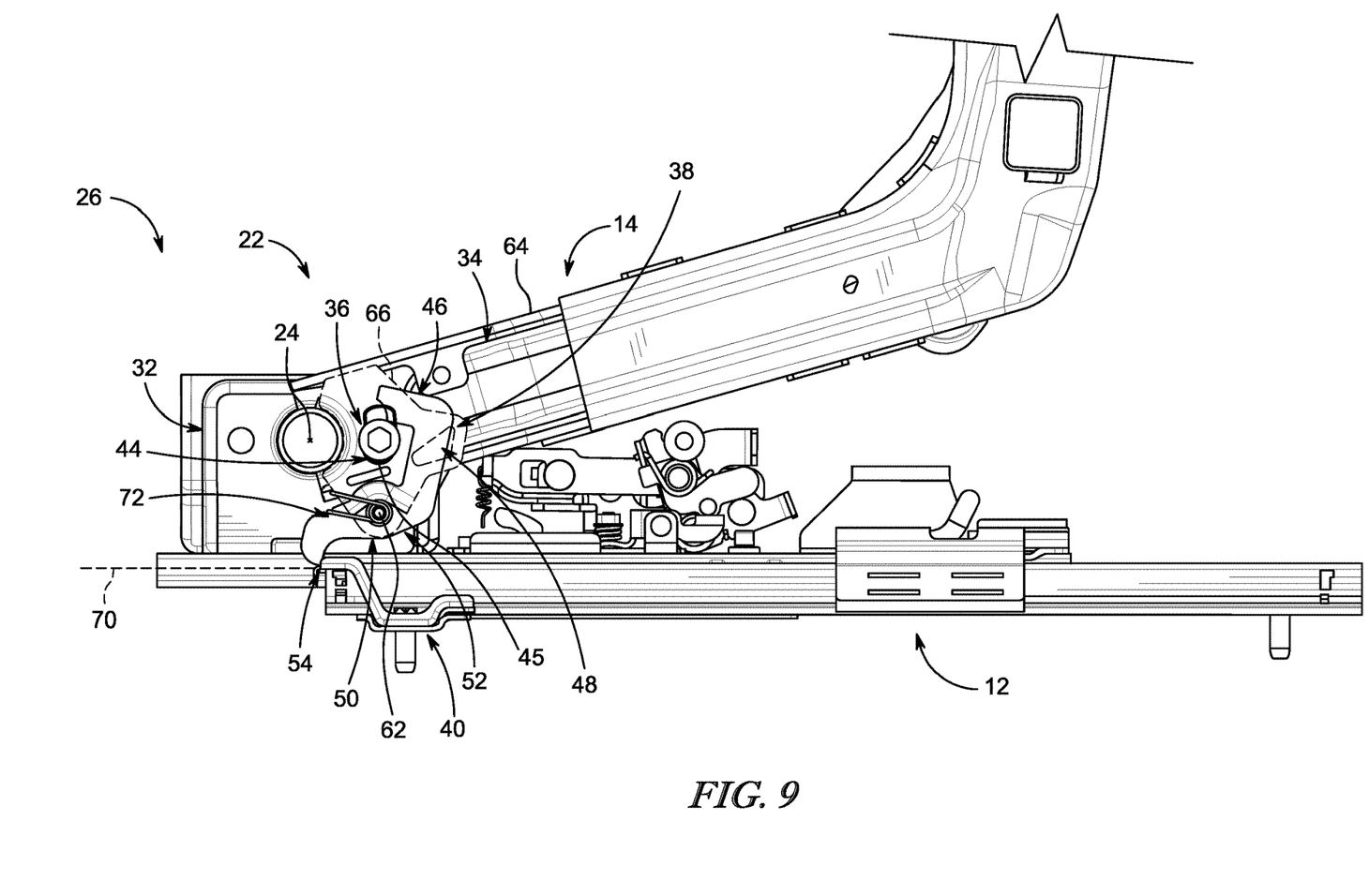
FIG. 9 is a side view of the occupant support with portions removed showing the vehicle seat moved further toward the slid-back configuration and the retainer hook contacting the stop to free the retainer hook from the retainer pin and urge the vehicle seat toward the horizontal-use configuration.
Figure 10:
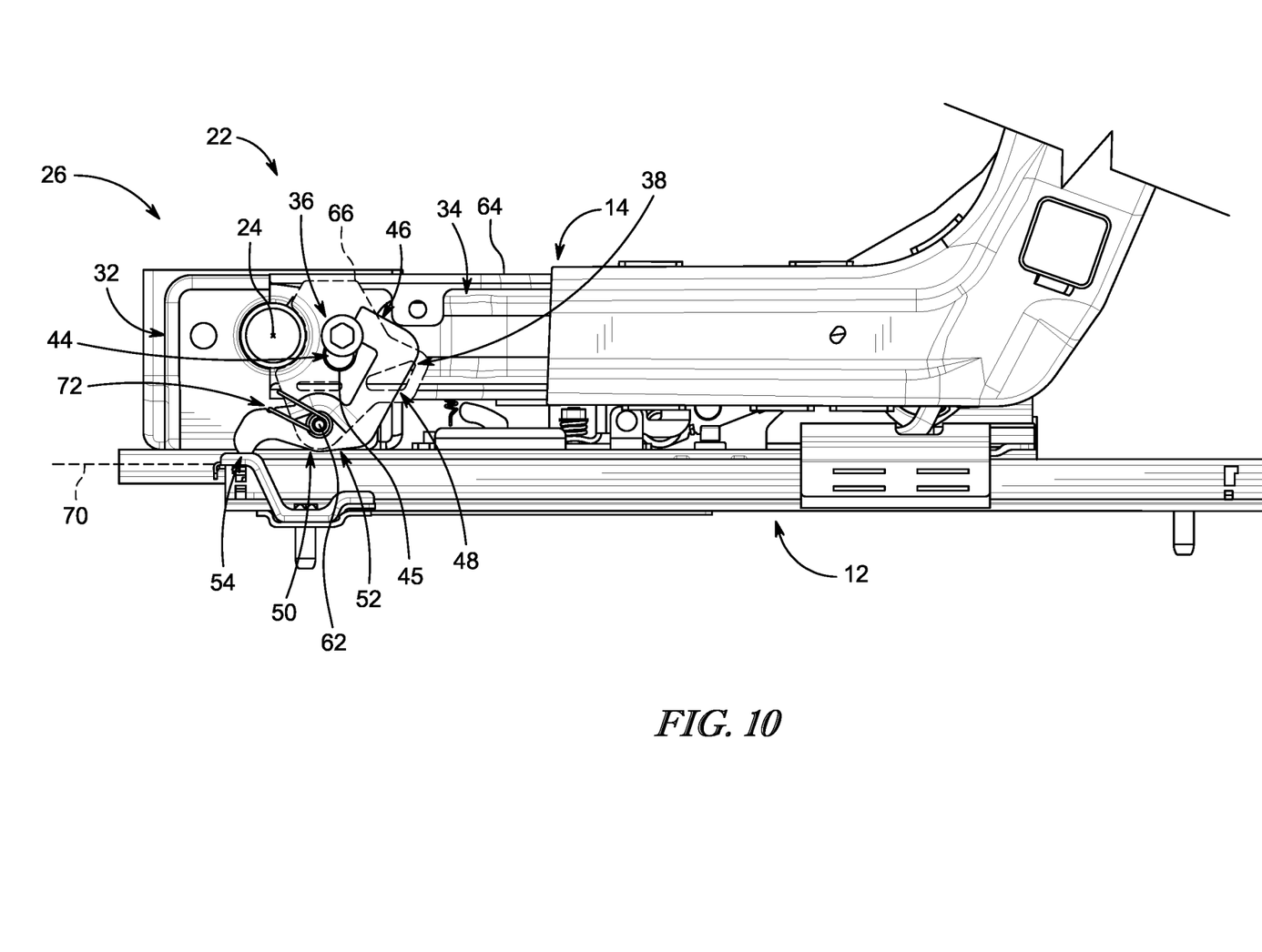
FIG. 10 is a side view of the occupant support with portions removed showing the vehicle seat moved further toward the slid-back configuration and returned to the horizontal-use configuration where the retainer hook is positioned above the upper limit of the stop.

The stationary stop 40 is a rigid component having an upper surface 41 that is arranged to extend along a horizontal limit plane 70 as shown in FIGS. 5-8. The upper surface 41 provides an upper limit of the stop 40 relative to the retainer hook 38. The retainer hook 38 is located entirely above the horizontal limit plane 70 when the vehicle seat 14 is in the horizontal-use configuration as shown in FIGS. 5 and 6. The retainer hook 38 is biased such that a portion of the retainer hook 38 extends below the horizontal limit plane 70 when the vehicle seat 14 is in the tilted configuration as shown in FIGS. 7 and 8. The retainer hook 38 is configured to engage the stationary stop 40 as the vehicle seat 14 is moved from the slid-forward configuration toward the slid-back configuration to cause the vehicle seat to return to the horizontal-use configuration as shown in FIGS. 9 and 10. The tilt-limiting unit 22 and portions of the vehicle seat 14 and foundation frame 12 are enlarged in FIGS. 11-14 to further illustrate the movements of each component relative to one another as the vehicle seat 14 changes between the horizontal-use configuration and the tilted configuration.

In operation, the vehicle seat 14 may be slid along the foundation frame 12 from the slid-back configuration, as shown in FIG. 5, toward the slid-forward configuration, as shown in FIG. 6, when a user desires to enter or leave a space behind the occupant support 10. The lever arm 54 is positioned aft of the stationary stop 40 when the vehicle seat 14 is in the slid-back configuration as shown in FIG. 5. The lever arm 54 is positioned forward of the stationary stop 40 when the vehicle seat 14 is in the forward-seating configuration and the slid-forward configuration as shown in FIGS. 6 and 7. In the forward-seating configuration, the actuator 18 may be engaged by a user to release the seat lock 20 so that the pivotable frame 34 may pivot about the frame pivot axis 24 from the horizontal-use configuration, as shown in FIG. 6, to the tilted configuration, as shown in FIG. 7. In some embodiments, the seat lock 20 is blocked from being released until the vehicle seat 14 is in the forward-seating configuration to ensure that the lever arm 54 is positioned forward of the stationary stop 40 when the vehicle seat 14 is moved to the tilted configuration.

The retainer hook 38 is biased to rotate about axis 62 relative to the pivotable frame 34 as the pivotable frame 34 rotates about the frame pivot axis 24 between the horizontal-use configuration and the tilted configuration as shown in FIGS. 6-8. The lever arm 54 is biased downwardly toward the stationary stop 40 at all times by a torsion spring 72. The torsion spring 72 applies opposite forces against the lever arm 54 and the pivotable frame 34 to push the lever arm 54 downwardly toward the stationary stop 40 and away from the pivotable frame 34 so that the lever arm 54 extends below the horizontal limit plane 70 of the stationary stop 40 in the tilted configuration. The retainer hook 38 may be biased by another type of spring, such as a helical tension spring, a helical compression spring, a leaf spring, a plate spring, or any other suitable type of spring.

The retainer hook 38 is configured to move relative to the retainer pin 36 between a freed position and a locked position when the vehicle seat 14 changes from the horizontal-use configuration to the tilted configuration as shown in FIGS. 6, 7, 11, and 12. In the freed position, the retainer section 46 is biased into contact with a side edge of the retainer pin 36 by the torsion spring 72. When the vehicle seat 14 is moved to the tilted configuration, the retainer hook 38 is moved upwardly with the pivotable frame 34 relative to the retainer pin 36 until the retainer pin 36 contacts the lower end 45 of the second pin-receiving slot 44 thereby stopping rotation of the pivotable frame 34 about the frame pivot axis 24 as shown in FIGS. 7, 8, and 12. The retainer section 46 is able to rotate forward about axis 62 and around the retainer pin 36 as the retainer hook 38 is moved upwardly with the pivotable frame 34 relative to the retainer pin 36 and the retainer section 46 clears the retainer pin 36. The retainer hook 38 is biased to rotate about the retainer-hook pivot axis 62 by the torsion spring 72 such that the retainer section 46 moves forward and the body section 48 contacts the retainer pin 36 to arrange the retainer hook 38 in the locked position as shown in FIGS. 7 and 12.

In the locked position, the retainer section 46 at least partially extends over an upper end of the retainer pin 36 to hold the pivotable frame 34 in the tilted configuration as shown in FIGS. 7 and 8. The retainer section 46 at least partially overlaps with the second pin-receiving slot 44 in the locked configuration when the vehicle seat 14 is viewed from the side. The retainer section 46 cooperates with the lower end 45 of the second pin-receiving slot 44 to block the retainer pin 36 from traveling through the second pin-receiving slot 44. The retainer section 46 and the body section 48 form an L-shape when viewed from the side. In the locked position, the retainer-hook pivot axis 62 is aligned with the retainer pin 36 such that a line 84 between them is perpendicular to horizontal reference plane 82 as shown in FIG. 12. This arrangement may facilitate changing between the freed and locked positions.

Figure 13:
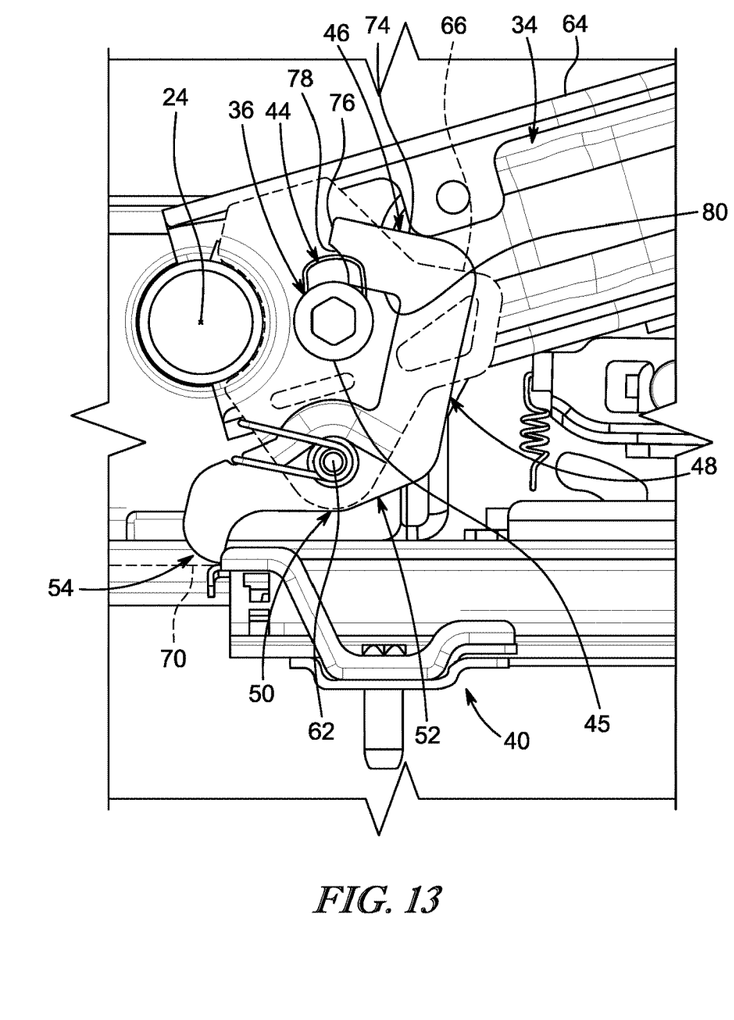
FIG. 13 is an enlarged portion of FIG. 9 showing the retainer hook contacting the stop to pivot the retainer hook out of contact with the retainer pin so that the vehicle seat is free to move from the tilted configuration to the horizontal-use configuration.
Figure 14:
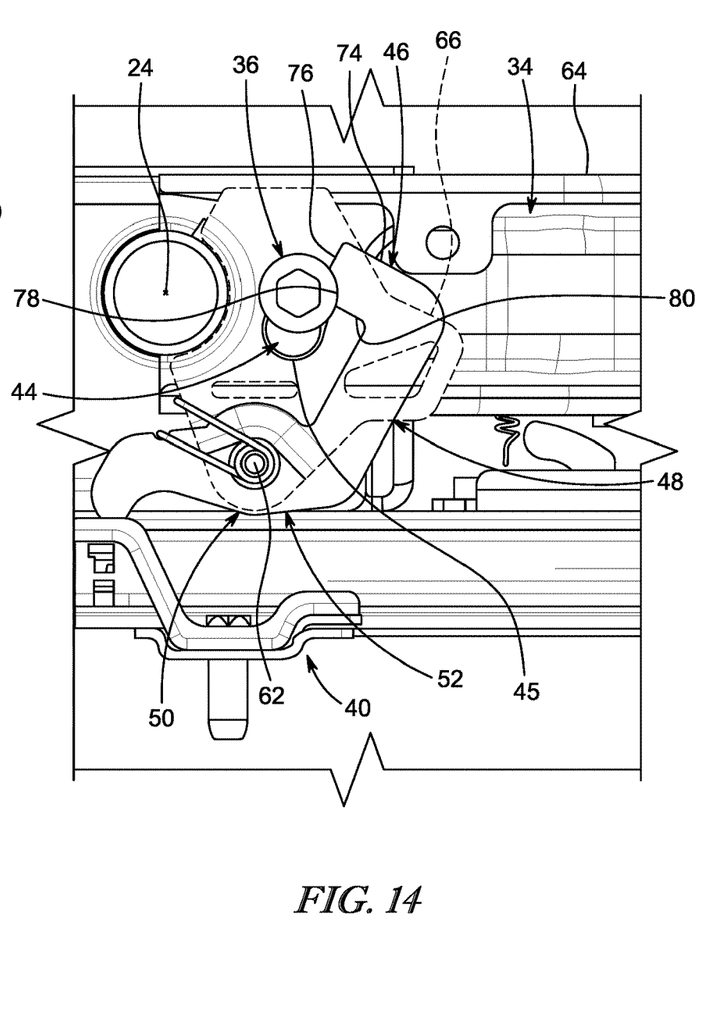
FIG. 14 is an enlarged portion of FIG. 10 showing the vehicle seat returned to the horizontal-use configuration and the retainer hook returned to a position above the upper limit of the stop.

To change the vehicle seat 14 from the tilted configuration to the horizontal use configuration, the vehicle seat 14 is moved from the slid-forward configuration toward the slid-back configuration as shown in FIGS. 7-9. The lever arm 54 is configured to engage the stationary stop 40 as the vehicle seat is moved from the slid-forward configuration toward the slid-back configuration as shown in FIG. 8. The stationary stop 40 causes the retainer hook 38 to rotate from the locked position to the freed position where the retainer section 46 is entirely offset from the second pin-receiving slot 44 so that the second pin-receiving slot 44 is clear for the retainer pin 36 to travel there through as shown in FIGS. 9 and 13. The position of the lever arm 54 relative to the retainer-hook pivot axis 62 also urges the pivotable frame 34 from the horizontal-use configuration to the tilted configuration when the lever arm 54 contacts the stop 40 such that rearward sliding of the vehicle seat 14 automatically changes the vehicle seat 14 to the horizontal-use configuration with minimal effort from the user as shown in FIGS. 10 and 14. The lever arm 54 is shaped to grip the stationary stop 40 and apply a downward pulling force on the pivotable frame 34 to urge the pivotable frame 34 back to the horizontal-use configuration.

The retainer section 46 is defined by an upper edge 74, a forward edge 76 that extends downwardly from the upper edge 74, a curved edge 78 that extends rearwardly and downwardly from the forward edge 76, and a lower edge 80 that extends rearwardly from the curved edge 78 as shown in FIGS. 11-14. The curved edge 78 engages the retainer pin 36 when the vehicle seat 14 is in the horizontal-use configuration. The lower edge 80 engages the retainer pin 36 when the vehicle seat 14 is in the tilted configuration. The curved edge has a radius with a center that generally corresponds with a center of the retainer pin 36, but may be slightly offset from the center of the retainer pin 36 so that the retainer section 46 can move relative to the retainer pin 36.

The following numbered clauses include embodiments that are contemplated and non-limiting:

Clause 1. An occupant support comprises a foundation frame adapted to be coupled to a floor of a vehicle.

Clause 2. The occupant support of clause 1, any other suitable clause, or any suitable combination of clauses, further comprising a vehicle seat mounted on the foundation frame for sliding movement along foundation frame between a slid-back configuration and a slid-forward configuration and configured to move from a horizontal-use configuration to a tilted configuration when in the slid-forward configuration, the vehicle seat including a stationary frame mounted to the foundation frame and a pivotable frame coupled to the stationary frame and configured to pivot about a frame pivot axis as the occupant changes between the horizontal-use configuration and the tilted configuration.

Clause 3. The occupant support of clause 2, any other suitable clause, or any suitable combination of clauses, further comprising a pivot-control system including an actuator, a seat lock coupled to the actuator and configured to block the vehicle seat from moving from the horizontal-use configuration to the tilted configuration until the vehicle seat is moved to the slid forward configuration and the actuator is activated to release the seat lock, and a tilt-limiting unit configured to retain the vehicle seat in the tilted configuration until the vehicle seat is moved from the slid-forward configuration toward the slid-back configuration.

Clause 4. The occupant support of clause 3, any other suitable clause, or any suitable combination of clauses, wherein the tilt-limiting unit includes a retainer pin mounted to the stationary frame in a fixed position relative to the frame pivot axis, a retainer hook coupled to the pivotable frame and biased to a first position where the retainer hook blocks the vehicle seat from moving from the tilted configuration to the horizontal-use configuration, and a stationary stop coupled to the foundation frame and configured to engage the retainer hook as the vehicle seat is moved from the slid-forward configuration toward the slid-back configuration to rotate the retainer hook to a second position and to urge the vehicle seat toward the horizontal-use configuration.

Clause 5. The occupant support of clause 4, any other suitable clause, or any suitable combination of clauses, wherein the retainer hook includes a retainer section arranged to engage the retainer pin when the vehicle seat is in the tilted configuration, a body section coupled to the retainer section, and a lever section that extends forward away from the body section and is spaced apart from the retainer section.

Clause 6. The occupant support of clause 5, any other suitable clause, or any suitable combination of clauses, wherein the retainer section is defined by an upper edge, a forward edge that extends downwardly from the upper edge, a curved edge that extends rearwardly and downwardly from the forward edge, and a lower edge that extends rearwardly from the curved edge.

Clause 7. The occupant support of clause 6, any other suitable clause, or any suitable combination of clauses, wherein the curved edge engages the retainer pin when the vehicle seat is in the horizontal-use configuration and the lower edge engages the retainer pin when the vehicle seat is in the tilted configuration.

Clause 8. The occupant support of clause 5, any other suitable clause, or any suitable combination of clauses, wherein the lever section is mounted to the pivotable frame for pivotable rotation about a retainer-hook pivot axis that passes through the lever section.

Clause 9. The occupant support of clause 8, any other suitable clause, or any suitable combination of clauses, wherein the lever section includes a lever mount that extends forward from the body section and a lever arm that extends downwardly from a forwardmost end of the lever mount toward the stop.

Clause 10. The occupant support of clause 9, any other suitable clause, or any suitable combination of clauses, wherein the tilt-limiting unit further includes a torsion spring that applies a force on the vehicle seat and the lever arm to bias the lever arm of the lever section downwardly toward the stop.

Clause 11. The occupant support of clause 9, any other suitable clause, or any suitable combination of clauses, wherein the lever arm is arranged to lie above an upper limit of the stop when the vehicle seat is in the horizontal-use configuration and is arranged to extend below the upper limit of the stop when the vehicle seat is in the tilted configuration.

Clause 12. The occupant support of clause 4, any other suitable clause, or any suitable combination of clauses, wherein the retainer hook is in contact with the retainer pin when the vehicle seat is in the slid-forward configuration, the slid back configuration, and the horizontal-use configuration.

Clause 13. The occupant support of clause 12, any other suitable clause, or any suitable combination of clauses, wherein the retainer pin is aligned with the frame pivot axis along a horizontal reference plane that passes through a center of both the retainer pin and the frame pivot axis when the vehicle seat is in the horizontal-use configuration and the tilted configuration.

Clause 14. An occupant support comprises a foundation frame adapted to be coupled to a floor of a vehicle.

Clause 15. The occupant support of clause 14, any other suitable clause, or any suitable combination of clauses, a vehicle seat mounted on the foundation frame for sliding movement along foundation frame between a slid-back configuration and a slid-forward configuration and configured to move from a horizontal-use configuration to a tilted configuration.

Clause 16. The occupant support of clause 15, any other suitable clause, or any suitable combination of clauses, a tilt-limiting unit configured to retain the vehicle seat in the tilted configuration.

Clause 17. The occupant support of clause 16, any other suitable clause, or any suitable combination of clauses, wherein the tilt-limiting unit includes a stationary retainer coupled to the vehicle seat in a fixed position relative to the foundation frame, a movable retainer biased to a first position where the movable retainer engages the stationary retainer to block the vehicle seat from moving from the tilted configuration to the horizontal-use configuration, and a stationary stop coupled to the foundation frame and configured to engage the movable retainer as the vehicle seat is moved toward the slid-back configuration to move the movable retainer to a second position where the vehicle seat is free to move from the tilted configuration to the horizontal-use configuration.

Clause 18. The occupant support of clause 17, any other suitable clause, or any suitable combination of clauses, wherein the movable retainer includes a retainer section arranged to engage the retainer pin when the vehicle seat is in the tilted configuration, a body section that extends downwardly away from the retainer section, and a lever section that extends forward away from the body section and downwardly away from the retainer section.

Clause 19. The occupant support of clause 18, any other suitable clause, or any suitable combination of clauses, wherein the retainer section is defined by an upper edge, a forward edge that extends downwardly from the upper edge, a curved edge that extends rearwardly and downwardly from the forward edge, and a lower edge that extends rearwardly from the curved edge.

Clause 20. The occupant support of clause 19, any other suitable clause, or any suitable combination of clauses, wherein the curved edge engages the stationary retainer when the vehicle seat is in the horizontal-use configuration and the lower edge engages the stationary retainer when the vehicle seat is in the tilted configuration.

Clause 21. The occupant support of clause 18, any other suitable clause, or any suitable combination of clauses, wherein the lever section is mounted to the vehicle seat for pivotable rotation about a pivot axis that passes through the lever section.

Clause 22. The occupant support of clause 21, any other suitable clause, or any suitable combination of clauses, wherein the lever section includes a lever mount that extends forward from the body section and a lever arm that extends downwardly from a forwardmost end of the lever mount toward the stop.

Clause 23. The occupant support of clause 22, any other suitable clause, or any suitable combination of clauses, wherein the tilt-limiting unit further includes a torsion spring that applies a force on the vehicle seat and the lever arm to bias the lever arm of the lever section downwardly toward the stop.

Clause 24. The occupant support of clause 23, any other suitable clause, or any suitable combination of clauses, wherein the lever arm is arranged to lie above an upper limit of the stop when the vehicle seat is in the horizontal-use configuration and is arranged to extend below the upper limit of the stop when the vehicle seat is in the tilted configuration.

Clause 25. The occupant support of clause 17, any other suitable clause, or any suitable combination of clauses, wherein the movable retainer is in contact with the stationary retainer when the vehicle seat is in the slid-forward configuration, the slid back configuration, and the horizontal-use configuration.

Clause 26. The occupant support of clause 17, any other suitable clause, or any suitable combination of clauses, wherein the stationary retainer is aligned with the frame pivot axis along a horizontal reference plane that passes through a center of both the stationary retainer and the frame pivot axis when the vehicle seat is in the horizontal-use configuration and the tilted configuration, and wherein the movable retainer is mounted to the vehicle seat for pivotable rotation about a pivot axis, the pivot axis being aligned vertically with the stationary retainer along a line that is perpendicular to the horizontal reference plane when the vehicle seat is in the tilted configuration.

The invention claimed is:
1. An occupant support comprising
a foundation frame adapted to be coupled to a floor of a vehicle,
a vehicle seat mounted on the foundation frame for sliding movement along foundation frame between a slid-back configuration and a slid-forward configuration and con- figured to move from a horizontal-use configuration to a tilted configuration when in the slid-forward configuration, the vehicle seat including a stationary frame mounted to the foundation frame and a pivotable frame coupled to the stationary frame and configured to pivot about a frame pivot axis as the occupant changes between the horizontal-use configuration and the tilted configuration, and a pivot-control system including an actuator, a seat lock coupled to the actuator and configured to block the vehicle seat from moving from the horizontal-use configuration to the tilted configuration until the vehicle seat is moved to the slid forward configuration and the actuator is activated to release the seat lock, and a tilt-limiting unit configured to retain the vehicle seat in the tilted configuration until the vehicle seat is moved from the slid-forward configuration toward the slid-back configuration, wherein the tilt-limiting unit includes a retainer pin mounted to the stationary frame in a fixed position relative to the frame pivot axis, a retainer hook coupled to the pivotable frame and biased to a first position where the retainer hook blocks the vehicle seat from moving from the tilted configuration to the horizontal-use configuration, and a stationary stop coupled to the foundation frame and configured to engage the retainer hook as the vehicle seat is moved from the slid-forward configuration toward the slid-back configuration to rotate the retainer hook to a second position and to urge the vehicle seat toward the horizontal-use configuration.

2. The occupant support of claim 1, wherein the retainer hook includes a retainer section arranged to engage the retainer pin when the vehicle seat is in the tilted configuration, a body section coupled to the retainer section, and a lever section that extends forward away from the body section and is spaced apart from the retainer section.

3. The occupant support of claim 2, wherein the retainer section is defined by an upper edge, a forward edge that extends downwardly from the upper edge, a curved edge that extends rearwardly and downwardly from the forward edge, and a lower edge that extends rearwardly from the curved edge.

4. The occupant support of claim 3, wherein the curved edge engages the retainer pin when the vehicle seat is in the horizontal-use configuration and the lower edge engages the retainer pin when the vehicle seat is in the tilted configuration.

5. The occupant support of claim 2, wherein the lever section is mounted to the pivotable frame for pivotable rotation about a retainer-hook pivot axis that passes through the lever section.

6. The occupant support of claim 5, wherein the lever section includes a lever mount that extends forward from the body section and a lever arm that extends downwardly from a forwardmost end of the lever mount toward the stop.

7. The occupant support of claim 6, wherein the tilt-limiting unit further includes a torsion spring that applies a force on the vehicle seat and the lever arm to bias the lever arm of the lever section downwardly toward the stop.

8. The occupant support of claim 6, wherein the lever arm is arranged to lie above an upper limit of the stop when the vehicle seat is in the horizontal-use configuration and is arranged to extend below the upper limit of the stop when the vehicle seat is in the tilted configuration.

9. The occupant support of claim 1, wherein the retainer hook is in contact with the retainer pin when the vehicle seat is in the slid-forward configuration, the slid back configuration, and the horizontal-use configuration.

10. The occupant support of claim 9, wherein the retainer pin is aligned with the frame pivot axis along a horizontal reference plane that passes through a center of both the retainer pin and the frame pivot axis when the vehicle seat is in the horizontal-use configuration and the tilted configuration.

11. An occupant support comprising
a foundation frame adapted to be coupled to a floor of a vehicle,
a vehicle seat mounted on the foundation frame for sliding movement along foundation frame between a slid-back configuration and a slid-forward configuration and configured to move from a horizontal-use configuration to a tilted configuration, and
a tilt-limiting unit configured to retain the vehicle seat in the tilted configuration,
wherein the tilt-limiting unit includes a stationary retainer coupled to the vehicle seat in a fixed position relative to the foundation frame, a movable retainer biased to a first position where the movable retainer engages the stationary retainer to block the vehicle seat from moving from the tilted configuration to the horizontal-use configuration, and a stationary stop coupled to the foundation frame and configured to engage the movable retainer as the vehicle seat is moved toward the slid-back configuration to move the movable retainer to a second position where the vehicle seat is free to move from the tilted configuration to the horizontal-use configuration.

12. The occupant support of claim 11, wherein the movable retainer includes a retainer section arranged to engage the retainer pin when the vehicle seat is in the tilted configuration, a body section that extends downwardly away from the retainer section, and a lever section that extends forward away from the body section and downwardly away from the retainer section.

13. The occupant support of claim 12, wherein the retainer section is defined by an upper edge, a forward edge that extends downwardly from the upper edge, a curved edge that extends rearwardly and downwardly from the forward edge, and a lower edge that extends rearwardly from the curved edge.

14. The occupant support of claim 13, wherein the curved edge engages the stationary retainer when the vehicle seat is in the horizontal-use configuration and the lower edge engages the stationary retainer when the vehicle seat is in the tilted configuration.

15. The occupant support of claim 12, wherein the lever section is mounted to the vehicle seat for pivotable rotation about a pivot axis that passes through the lever section.

16. The occupant support of claim 15, wherein the lever section includes a lever mount that extends forward from the body section and a lever arm that extends downwardly from a forwardmost end of the lever mount toward the stop.

17. The occupant support of claim 16, wherein the tilt-limiting unit further includes a torsion spring that applies a force on the vehicle seat and the lever arm to bias the lever arm of the lever section downwardly toward the stop.

18. The occupant support of claim 16, wherein the lever arm is arranged to lie above an upper limit of the stop when the vehicle seat is in the horizontal-use configuration and is arranged to extend below the upper limit of the stop when the vehicle seat is in the tilted configuration.

19. The occupant support of claim 11, wherein the movable retainer is in contact with the stationary retainer when the vehicle seat is in the slid-forward configuration, the slid back configuration, and the horizontal-use configuration.

20. The occupant support of claim 11, wherein the stationary retainer is aligned with the frame pivot axis along a horizontal reference plane that passes through a center of both the stationary retainer and the frame pivot axis when the vehicle seat is in the horizontal-use configuration and the tilted configuration, and wherein the movable retainer is mounted to the vehicle seat for pivotable rotation about a pivot axis, the pivot axis being aligned vertically with the stationary retainer along a line that is perpendicular to the horizontal reference plane when the vehicle seat is in the tilted configuration.

* * * * *